(12) United States Patent
Bartlett et al.

(10) Patent No.: US 10,986,392 B2
(45) Date of Patent: Apr. 20, 2021

(54) HYBRID IR/RF REMOTE CONTROL SYSTEM

(71) Applicant: Charter Communications Operating, LLC, St. Louis, MO (US)

(72) Inventors: Stephen Bartlett, Castle Rock, CO (US); Gregory Greene, Littleton, CO (US); Wen-Yen Huang, Englewood, CO (US)

(73) Assignee: Charter Communications Operating, LLC, St. Louis, MO (US)

( * ) Notice: Subject to any disclaimer, the term of this patent is extended or adjusted under 35 U.S.C. 154(b) by 0 days.

(21) Appl. No.: 16/435,099

(22) Filed: Jun. 7, 2019

(65) Prior Publication Data

US 2020/0389693 A1    Dec. 10, 2020

(51) Int. Cl.
*H04N 21/41* (2011.01)
*H04N 21/422* (2011.01)
*H04N 21/418* (2011.01)

(52) U.S. Cl.
CPC ... *H04N 21/41265* (2020.08); *H04N 21/4126* (2013.01); *H04N 21/42221* (2013.01); *H04N 21/4131* (2013.01); *H04N 21/4184* (2013.01); *H04N 21/42225* (2013.01)

(58) Field of Classification Search
CPC ......... H04N 21/42207; H04N 21/4126; H04N 21/42221; H04N 21/4131; H04N 21/42225; H04N 21/418
USPC ........................................... 340/12.53, 13.33
See application file for complete search history.

(56) References Cited

U.S. PATENT DOCUMENTS

| | | | |
|---|---|---|---|
| 5,500,691 A | 3/1996 | Martin et al. | |
| 5,585,953 A | 12/1996 | Zavrel | |
| 5,630,204 A * | 5/1997 | Hylton | H04L 12/2801 348/E7.05 |
| 6,547,482 B2 | 6/2003 | Radomsky et al. | |
| 6,784,805 B2 * | 8/2004 | Harris | G08C 17/00 340/12.22 |
| 6,915,109 B2 | 7/2005 | Wouters et al. | |
| 6,967,588 B2 * | 11/2005 | Zustak | G08C 19/28 340/12.26 |
| 7,379,778 B2 * | 5/2008 | Hayes | H04L 12/282 700/66 |
| 8,009,054 B2 | 8/2011 | Reams | |
| 8,031,270 B1 * | 10/2011 | Wisniewski | G08C 17/02 348/734 |
| 8,544,054 B2 * | 9/2013 | Reams | H04N 21/4122 725/133 |
| 8,552,843 B2 | 10/2013 | Dizechi et al. | |

(Continued)

*Primary Examiner* — Adnan Aziz
(74) *Attorney, Agent, or Firm* — The Marbury Law Group, PLLC

(57) ABSTRACT

Embodiments include systems and methods for hybrid IR/RF communication over remote controller device. Controlling a smart lighting device. In embodiments, a processor of a remote controller device may receive receiving, from a customer premises device via an RF transceiver, synchronization information about a device under control in communication with the customer premises device. The remote controller device processor may update an indication of a device under control status based on the synchronization information. The remote controller device processor may send, via the IR transmitter, a command to the device under control based on the updated status of the device under control.

21 Claims, 8 Drawing Sheets

(56) References Cited

U.S. PATENT DOCUMENTS

| | | |
|---|---|---|
| 9,258,508 B2 | 2/2016 | Hardin |
| 9,310,787 B2 * | 4/2016 | Richardson ............ G08C 17/00 |
| 9,601,006 B2 | 3/2017 | Evans |
| 9,721,466 B2 | 8/2017 | Sallas et al. |
| 9,866,892 B2 | 1/2018 | Hardin |
| 10,031,647 B2 * | 7/2018 | Scott ................ H04N 21/42209 |
| 10,200,208 B2 * | 2/2019 | Gould .................. H04L 12/2825 |
| 10,498,830 B2 * | 12/2019 | Burd .................. H04L 12/2809 |
| 10,708,079 B2 * | 7/2020 | Gould .............. H04N 21/43615 |
| 2002/0191252 A1 | 12/2002 | Pugel |
| 2003/0095156 A1 * | 5/2003 | Klein ...................... G06F 3/0481 715/864 |
| 2003/0103088 A1 * | 6/2003 | Dresti ................ H04N 21/8543 715/835 |
| 2003/0141987 A1 * | 7/2003 | Hayes .................... G08C 19/28 340/12.25 |
| 2004/0041712 A1 | 3/2004 | Collovini et al. |
| 2004/0148632 A1 * | 7/2004 | Park .................. H04N 21/4131 725/81 |
| 2006/0161865 A1 * | 7/2006 | Scott ..................... G06F 3/0481 715/810 |
| 2006/0168618 A1 * | 7/2006 | Choi ..................... G08C 17/02 725/37 |
| 2007/0229465 A1 * | 10/2007 | Sakai ..................... G08C 17/00 345/173 |
| 2009/0247097 A1 * | 10/2009 | Ha ........................ H04B 1/202 455/143 |
| 2010/0169945 A1 * | 7/2010 | Kennedy .............. H04N 5/4403 725/110 |
| 2010/0201891 A1 * | 8/2010 | Laroia .................... G08C 17/00 348/734 |
| 2010/0207778 A1 * | 8/2010 | Haughawout .......... H04N 5/445 340/12.28 |
| 2010/0329689 A1 | 12/2010 | Sin |
| 2013/0169419 A1 * | 7/2013 | Lee ..................... H04N 21/4126 340/10.1 |
| 2014/0111318 A1 * | 4/2014 | Arling .................... G08C 17/02 340/12.22 |
| 2014/0270696 A1 | 9/2014 | Banks |
| 2015/0091708 A1 * | 4/2015 | Tan ........................ G08C 17/02 340/12.5 |
| 2015/0154858 A1 * | 6/2015 | Arling .................... G08C 17/02 340/12.28 |
| 2015/0187209 A1 * | 7/2015 | Brandt ................ H04L 65/1046 340/12.22 |
| 2015/0213710 A1 | 7/2015 | Kinne et al. |
| 2015/0365386 A1 * | 12/2015 | Sallas .................. H04W 12/003 713/171 |
| 2016/0125733 A1 * | 5/2016 | Sallas .................... G08C 17/02 398/106 |
| 2016/0343245 A1 * | 11/2016 | Chien .............. H04N 21/42226 |
| 2017/0164065 A1 * | 6/2017 | Aggarwal .......... H04N 21/4126 |
| 2018/0139512 A1 * | 5/2018 | Moran .................. G06F 1/1688 |
| 2018/0165951 A1 * | 6/2018 | Kim ........................ H04Q 9/00 |
| 2019/0116334 A1 * | 4/2019 | Lim ........................ G08C 19/28 |
| 2020/0090499 A1 * | 3/2020 | Kim ........................ G08C 23/04 |

\* cited by examiner

HYBRID IR/RF REMOTE CONTROL SYSTEM

BACKGROUND

Typical remote control devices use either infrared (IR) or radio frequency (RF) signals to send keys to device(s) under control (also referred to as a "controlled device(s)"). Remote control devices that use infrared communication are not paired to a particular device, and thus may send keys to multiple devices under control. However, IR communication is one-way, and thus the remote control device cannot receive communication from a device under control via IR signaling. RF communication enables two-way communication between devices, but requires a pairing operation that limits the usefulness of the remote control device to that of communicating with a paired device.

SUMMARY

Various embodiments include systems and methods of remotely controlling devices through the use of a hybrid remote control device that is configured with IR and RF communication capabilities to receive information from a customer premises device via an RF signal and to send commands to a device under control via an IR signal.

Various embodiments may include methods and devices configured to perform the methods of hybrid IR/RF communication, including receiving, from a customer premises device via an RF transceiver, synchronization information about a device under control in communication with the customer premises device, updating an indication of a device under control status based on the synchronization information, and sending, via the IR transmitter, a command to the device under control based on the updated status of the device under control.

Some embodiments may include performing a pairing operation with the customer premises device that enables the remote controller device to send commands to the device under control. Some embodiments may include receiving, from the customer premises device via the RF transceiver, device under control configuration information, and configuring the remote controller device to send commands to the device under control via the IR transmitter based on the device under control configuration information. Some embodiments may include receiving, from the customer premises device via the RF transceiver, operation information sent by the device under control to the customer premises device, and presenting the operation information from the device under control on or by an output device.

Some embodiments may include sending, via the IR transmitter, a command to the device under control based on the operation information from the device under control that is presented on the output device. Some embodiments may include sending, via the IR transmitter, a command for the device under control to the customer premises device based on the operation information from the device under control that is presented on the output device. In some embodiments, sending, via the IR transmitter, a command to the device under control based on the updated status of the device under control may include formatting the command based on the synchronization information.

Further embodiments may include a remote controller device including a memory, a RF transceiver, a IR transmitter, and a processor coupled to the memory, the RF transceiver, and the IR transmitter and being configured with processor-executable instructions to perform operations of the methods described above. Further embodiments may include a customer premises device including a communication interface, a memory, and a processor coupled to the communication interface and the memory and configured with processor-executable instructions to perform operations of the methods described above. Further embodiments may include processor-readable storage media upon which are stored processor executable instructions configured to cause a controller of a remote controller device to perform operations of the methods described above. Further embodiments may include processor-readable storage media upon which are stored processor executable instructions configured to cause a controller of a customer premises device to perform operations of the methods described above. Further embodiments may include a remote controller device including means for performing functions of the methods described above. Further embodiments may include a customer premises device including means for performing functions of the methods described above.

BRIEF DESCRIPTION OF THE DRAWINGS

The accompanying drawings, which are incorporated herein and constitute part of this specification, illustrate exemplary embodiments, and together with the general description given above and the detailed description given below, serve to explain the features of some embodiments.

DETAILED DESCRIPTION

Figure 1:
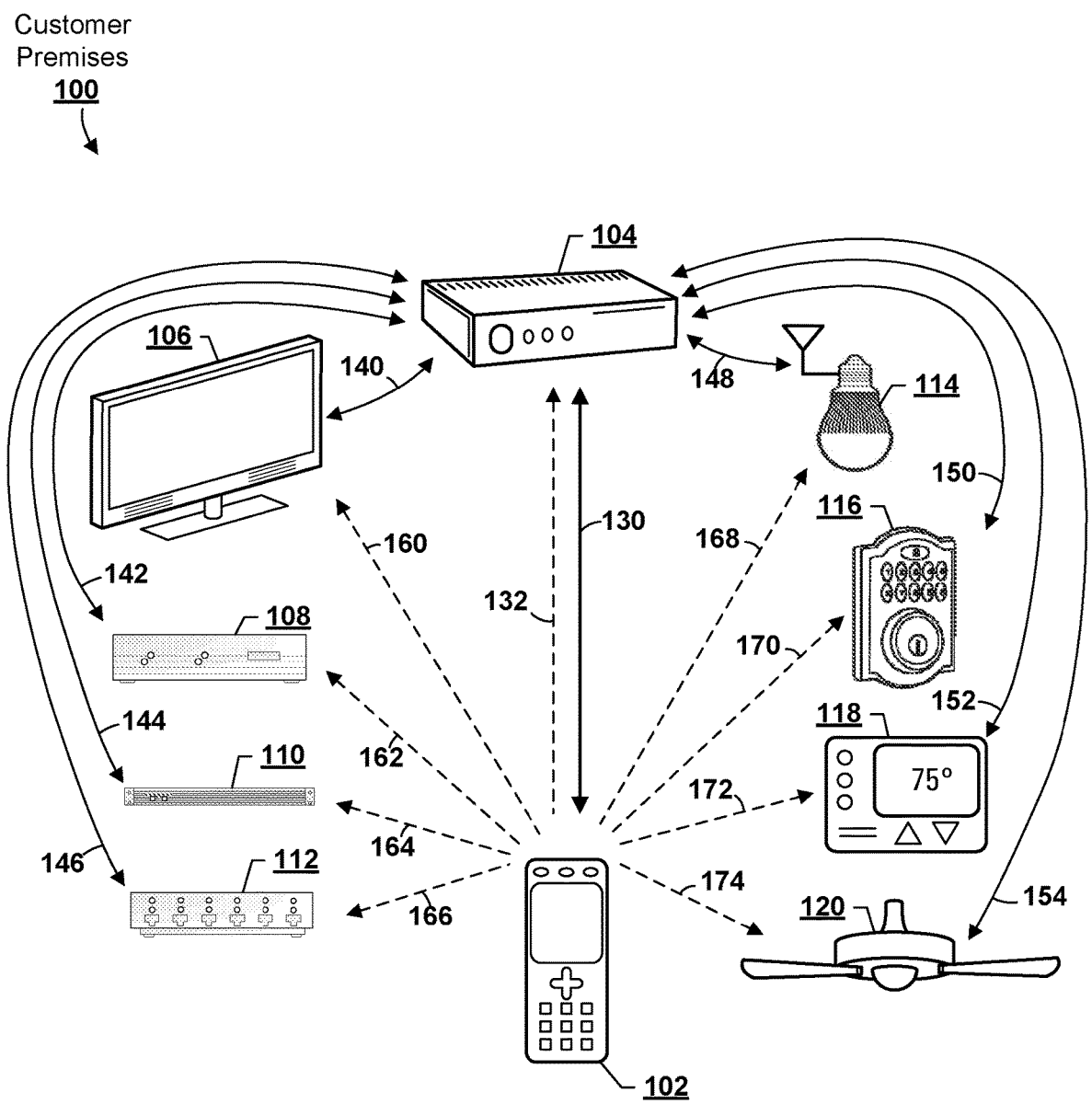
FIG. 1 is a communication system block diagram of a communication system suitable for use with some embodiments.

Various embodiments will be described in detail with reference to the accompanying drawings. Wherever possible, the same reference numbers will be used throughout the drawings to refer to the same or like parts. References made to particular examples and implementations are for illustrative purposes, and are not intended to limit the scope of various embodiments or the claims.

The terms "component," "module," "system," and the like are intended to include a computer-related entity, such as, but not limited to, hardware, firmware, a combination of hardware and software, software, or software in execution, which are configured to perform particular operations or functions. For example, a component may be, but is not limited to, a process running on a processor, a processor, an object, an executable, a thread of execution, a program, and/or a computer. By way of illustration, both an application running on a computing device and the computing device may be referred to as a component. One or more components may reside within a process and/or thread of execution and a component may be localized on one processor or core and/or distributed between two or more processors or cores. In addition, these components may execute from various non-transitory computer readable media having various instructions and/or data structures stored thereon. Components may communicate by way of local and/or remote processes, function or procedure calls, electronic signals, data packets, memory read/writes, and other known computer, processor, and/or process related communication methodologies.

Typical remote control devices use either infrared (IR) or radio frequency (RF) signals to send keys to devices under control. Remote control devices that use IR communication are not paired to a particular device under control, and thus may send keys to multiple devices under control. However, IR communication is one-way, and thus the remote control device cannot receive communication from a device under control via IR signaling. RF communication enables two-way communication between devices, but requires a pairing operation that limits the usefulness of the remote control device to communicating with a paired device under control.

An IR signal may include information including a "start" command, a device command code, a device address, and a "stop" command. The "start" command may indicate the start of a command sequence, and may correspond to a button press or other input to a control device (e.g., a remote control device). The "stop" command may indicate the end of a command sequence, and may correspond to a button release or other input to the control device. The device address may indicate a particular device or devices under control. The device command code may indicate the particular action or command for the device under control (e.g., power on, power off, or any other suitable action).

The one-way nature of IR communication may lead to a de-synchronization of the state of various devices under control. Typical IR controls systems have a relatively short range (typically approximately 30 feet), and IR signals require line-of-sight transmission and reception. IR signal interference or an obstruction may prevent an IR signal from reaching a device under control. In a case where multiple devices are under control, an IR signal to multiple device may reach some devices but not others. Operation states of various devices under control may fall out of synchronization. For example, a television may power on, but smart speakers may not power on. By initiating a subsequent power on command to turn on the speakers may result in the speakers powering off, but the television that was previously powered on, may now toggle off By formatting the power on command to target a specific device based on synchronization information feedback from the device under control, the problem of device synchronization may be solved.

As another example, some lights in a smart lighting system may dim according to a command from the remote control, but other lights may not receive the command. As another example, a ceiling fan may receive a command, but a smart thermostat may not receive the command, and thus elements of an environmental control system may fall out of synchronization. Other examples are also possible.

Various embodiments include systems and methods of remotely controlling devices through the use of a hybrid remote control device that is configured with IR and RF communication capabilities to receive information from a customer premises device via an RF signal and to send commands to a device under control via an IR signal. In some embodiments, the remote controller device may transmit commands or other signals to a device under control using IR signaling, and may establish a two-way RF communication link with a customer premises device or other similar device. In some embodiments, the remote controller device and the customer premises device may use the RF communication link as a two-way data "back channel." In some embodiments, the remote controller device and the customer premises device may use the RF communication link to, for example, configure the remote controller device to control another device (a "device under control"); to provide firmware updates to the remote controller device; to communicate a battery level status of the remote controller device to the consumer premises device; and/or to communicate other information either from the remote controller device to the consumer premises device, or from the consumer premises device to the remote controller device.

In some embodiments, the customer premises device may send synchronization information about a device under control that is in communication with the customer premises device via an RF signal to the remote controller device. The remote controller device may update an indication of the device under control status (e.g., in a memory of the remote controller device) based on the synchronization information. The remote controller device may send via an IR transmitter a command to the device under control based on the updated status of the device under control.

In some embodiments, the remote controller device and that customer premises device may perform a pairing operation that enables the remote controller device to send commands to the device under control. In some embodiments, the remote controller device may receive from the customer premises device, via RF signaling, device under control configuration information. The remote controller device may execute commands based on the device under control configuration information to configure the remote controller device to send commands to the device via an IR signal.

In some embodiments, the remote controller device may include an output device, such as a display, a speaker, and the like. In some embodiments, the remote controller device may receive from the customer premises device via an RF signal operation information that is sent by the device under control to the customer premises device. In some embodiments, the remote controller device may present the operation information from the device under control on the remote controller devices output device. For example, the remote controller device may receive and present status information about the operation of the device under control. The device under control may be a lighting system, a door lock, a ceiling fan, a television, a thermostat, or another suitable device (e.g., Internet of Things (IoT) device). In some embodiments, one or more devices under control may communicate with the customer premises device as part of a home network or IoT network.

In some embodiments, the remote controller device may send, via IR signaling, a command to a device under control based on the operation information that is presented on the output device of the remote controller device. In some embodiments, the remote controller device may send via IR signaling a command that is intended for the device under control to the customer premises device. The signaling pathway from the remote controller device via the customer premises device to a device under control may mitigate privacy concerns and prevent leakage of personal information. For example, the signaling pathway for typical IoT devices includes signals sent outside of a customer's premises via the Internet. In the case of a smart light, for example, a simple command to turn on a smart light device may originate from a controller, pass through a customer premises device, may be sent over the Internet to an Internet service provider server, may be transmitted over the Internet to a server device operated by the smart light device company, and then may be transmitted over the Internet to the smart light device via the customer premises equipment. In contrast, in various disclosed embodiments, the signaling pathway from the remote controller device via the customer premises device to a device under control does not pass outside customer's premises. Rather, the signaling pathway may use a direct line of sight IR communication pathway.

Various embodiments may be implemented within a variety of communication systems. FIG. 1 illustrates a communication system 100 suitable for use with some embodiments. A customer premises 100 may include a remote controller device 102, customer premises equipment (CPE) 104, and one or more device(s) under control, examples of which may include a smart television 106, an audio/video (A/V) receiver 108, a speaker device such as a sound bar 110, a hub device 112 (e.g., a cable/satellite receiver, a Wi-Fi router, an IoT hub device), a smart lighting system 114, a smart door lock 116, a smart thermostat 118, and a smart ceiling fan 120. The provided examples of device(s) under control is limited only for conciseness and is not intended to be exhaustive. In various embodiments, device(s) under control may include smart electrical plugs and smart switches, smart security systems, smart health devices and health monitors, smart pet feeders and pet monitors, smart appliances, smart electrical meters, smart toys, smart environmental monitors and environmental control systems, various Internet of Things devices, and any other suitable device(s) under control.

The CPE 104 may include various wired and wireless communication interfaces. The wired communication interfaces of CPE 104 may enable wired communication via one or more wired communication protocols. The wireless communication interfaces of the CPE 104 may include an IR signal receiver and an RF transceiver. The CPE 104 may communicate with device(s) under control 106-120 via wired and/or wireless communication links 140-154, respectively. In various embodiments, the communication links 140-154 may be two-way communication links. In some embodiments, one or more device(s) under control 106-154 may include a processor, a memory, IR signal receiver, and a power supply, which may be coupled through one or more connections (e.g., a bus, data lines, control lines, power lines, or other lines or a combination of connections). Each of the device(s) under control 106-154 may be configured to provide configuration information and/or operation information to the CPE 104. Each of the device(s) under control 106-154 may be further configured to receive command signaling from the CPE 104 via the communication links 140-148, respectively. Each of the device(s) under control 106-154 may be further configured to receive command signaling from the remote controller device 102 via the communication links 160-174, respectively.

In various embodiments, RF communication may utilize one or more communication protocols such as Radio Frequency for Consumer Electronics (RF4 CE), Wi-Fi, Bluetooth, Zigbee, any other communications based on Institute of Electrical and Electronics engineers (IEEE) 802 standards, or any other suitable wireless communications protocol. In various embodiments, IR communication may utilize one or more consumer IR communication protocols such as RECS-80, RC-5, RC-6, NEC/Renesas protocol, or any other suitable IR communication protocol. In various embodiments, wired communication may utilize one or more communication protocols such as ethernet, Recommended Standard (RS)-232, RS-485, Universal Asynchronous Receiver Transmitter (UART), Universal Synchronous/Asynchronous Receiver/Transmitter (USART), Universal Serial Bus (USB), High Definition Multimedia Interface (HDMI), or any other suitable wired communications protocol.

Figure 2:
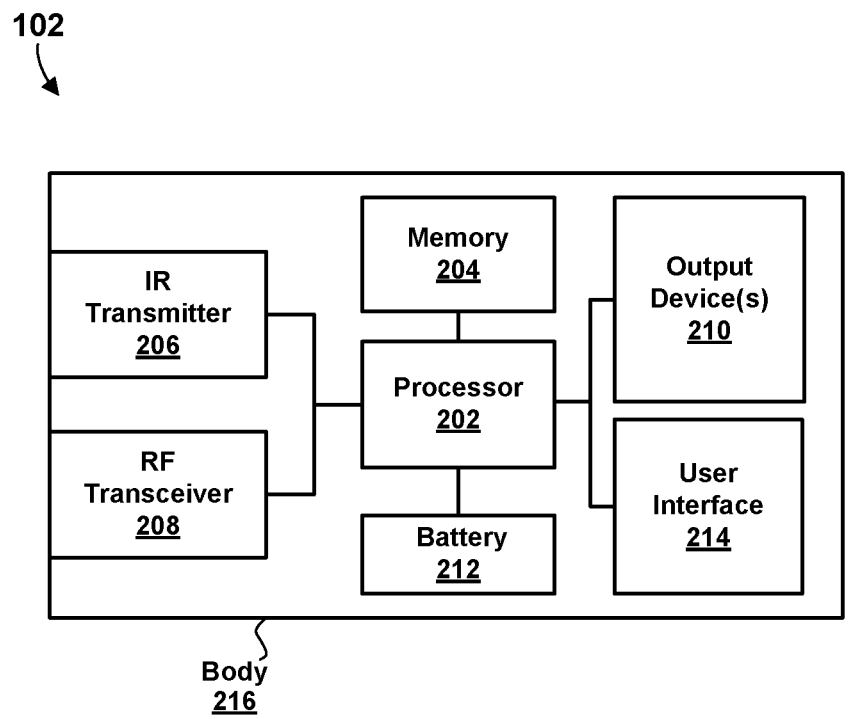
FIG. 2 is a component block diagram illustrating a remote controller device according to some embodiments.

FIG. 2 is a block diagram illustrating a remote controller device 102 according to various embodiments. With reference to FIGS. 1 and 2, the remote controller device 102 may include a body 216 and at least one processor, such as a processor 202, which may be coupled to at least one memory 204. The memory 204 may be a non-transitory computer-readable storage medium that stores processor-executable instructions. The memory 204 may store an operating system, user application software, and/or other executable instructions. The memory 204 may also store application data, such as an array data structure. The memory 204 may include one or more caches, read only memory (ROM), random access memory (RAM), electrically erasable programmable ROM (EEPROM), static RAM (SRAM), dynamic RAM (DRAM), or other types of memory. The processor 202 may read and write information to and from the memory 204. The memory 204 may also store instructions associated with one or more protocol stacks. A protocol stack generally includes computer executable instructions to enable communication using a radio access protocol or communication protocol.

The processor 202 and the memory 204 may communicate with at least one IR transmitter 206 and at least one RF transceiver 208. The IR transmitter 206 may be configured to transmit IR signals, such as IR control signals, to one or more devices (e.g., the customer premises device 104, device(s) under control 106-120). In some embodiments, the IR signals may be line-of-sight signals. The RF transceiver may be configured to transmit and/or receive RF signals. In some embodiments, the RF signals may be non-line of sight signals. The IR transmitter 206 and the RF transceiver 208 may include various circuitry and components to enable the sending, receiving, and processing of IR and RF signals, respectively (e.g., an IR signal emitter, a modulator/demodulator component, a power amplifier, a gain stage, a digital signal processor (DSP), a signal amplifier, a filter, and other suitable components).

The processor 202 may be coupled to a user interface 214 and a one or more output devices 210. The user interface 214 may be configured to receive a user input of various kinds. For example, the user interface 214 may include real and/or virtual switches, buttons, 4-way buttons, or other suitable elements. The user interface may be a touchscreen surface displaying programmable virtual buttons in conjunction with physical switches. In some embodiments, the one or more output devices 210 may include a display device, a speaker or other sound output device, an LED light or similar visible output device, a haptic output device such as a vibrator or shaker, or another suitable device capable of providing output for user perception. In some embodiments, the user interface 214 may include various other components, including other input, output, and processing components such as buttons, lights, switches, antennas, various connection ports, additional processors or integrated circuits, and many other components. In some embodiments, the user interface 214 may include one or more touch sensors, a touch screen, or another similar component capable of receiving an input. In some embodiments, a touch screen component can be incorporated into a display device that may be provided as an output device 210. The processor 202 may control the output device 210 to present signals, such as notifications of events or of the receipt of information, and information about operations of the remote controller device 200, a customer premises device, or a device under control.

The remote controller device 200 may include a battery 212 or another suitable power source coupled to the other components of the remote controller device 200 to provide electricity to power their operation. The battery 212 may be a chargeable or non-chargeable battery. The chargeable battery may be a wireless, induction charged battery.

Figure 3:
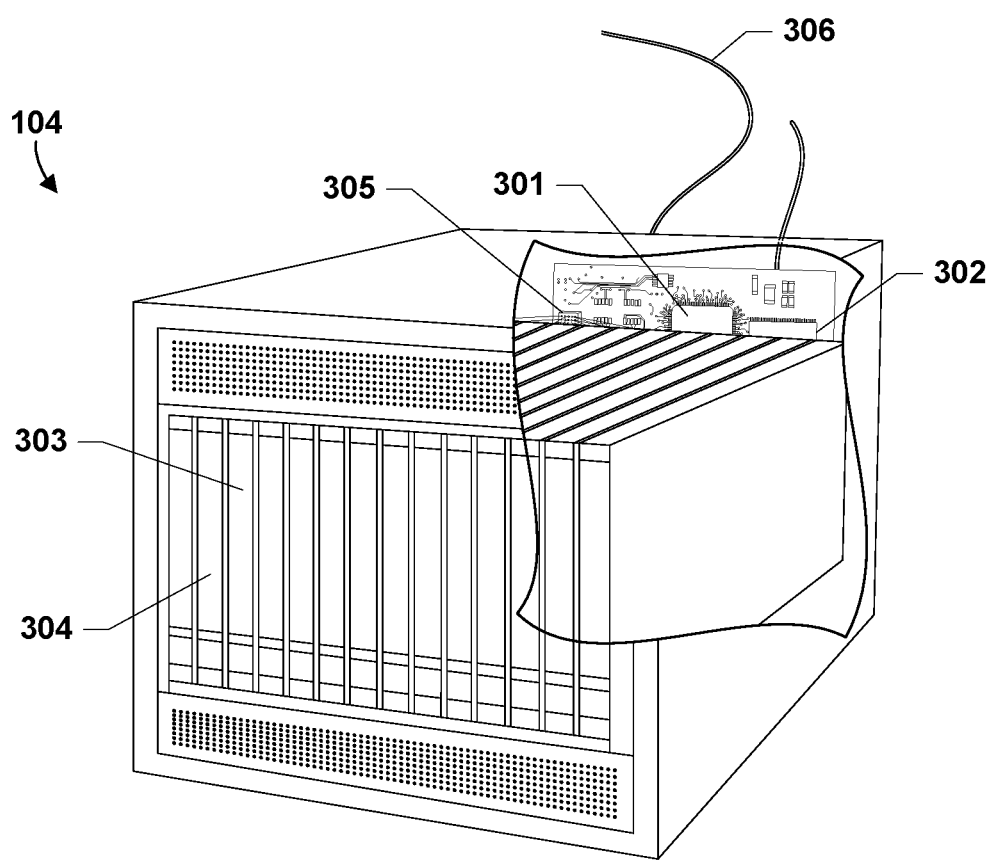
FIG. 3 is a component diagram of an example customer premises device suitable for use with some aspects.

Various aspects may be implemented on any of a variety of commercially available customer premises devices, such as the customer premises device 104 illustrated in FIG. 3. Such a customer premises device 104 may include a processor 301 coupled to volatile memory 302 and a large capacity nonvolatile memory, such as a disk drive 303. The customer premises device 104 may also include a floppy disc drive, compact disc (CD) or DVD disc drive 304 coupled to the processor 301. The customer premises device 104 may also include network access ports 306 coupled to the processor 301 for establishing data connections with a network connection circuit 305 and a communication network coupled to other communication system network elements.

The processor 301 may be any programmable microprocessor, microcomputer or multiple processor chip or chips that can be configured by software instructions (applications) to perform a variety of functions, including the functions of the various aspects described below. In some customer premises devices 104, multiple processors 301 may be provided, such as one or more processors dedicated to communication functions and one or more processors dedicated to performing other functions or running other applications. Software applications may be stored in the non-volatile memory 303 before they are accessed and loaded into the processor 301. The processor 301 may include internal memory sufficient to store the application software instructions.

Figure 4:
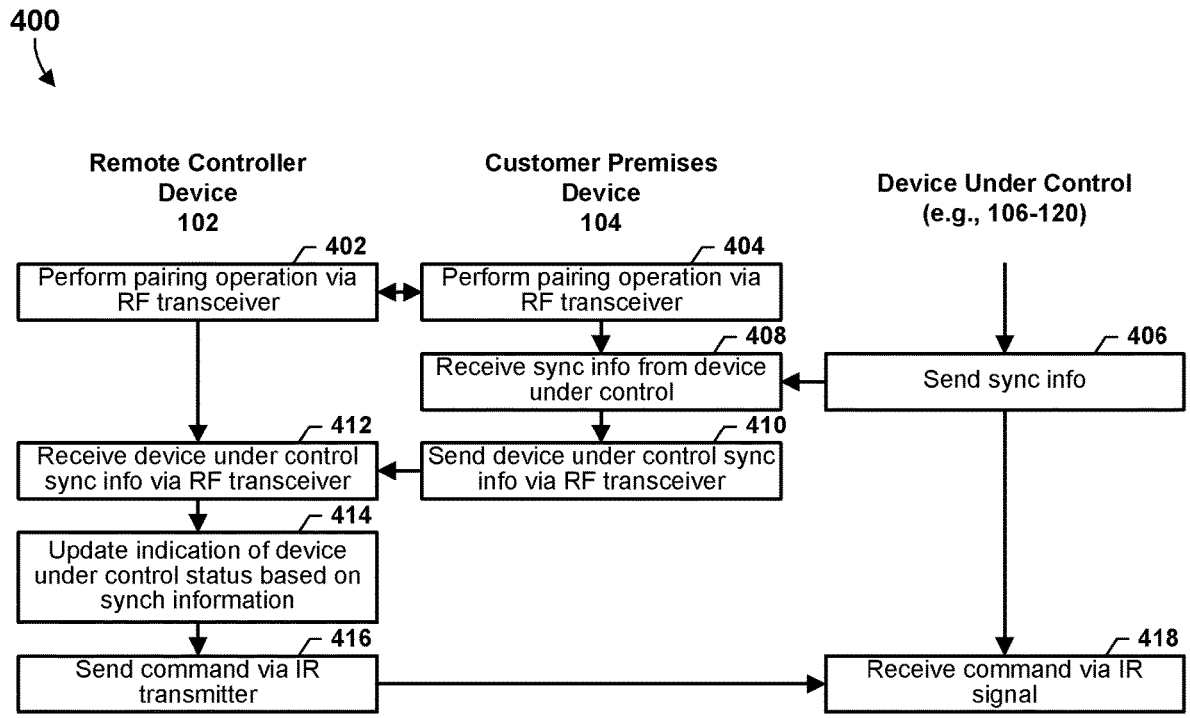
FIGS. 4-8 are process flow diagrams illustrating methods for hybrid IR/RF communication of a remote controller device according to some embodiments.

FIG. 4 is a process flow diagram illustrating a method 400 for hybrid IR/RF communication of a remote controller device according to some embodiments. With reference to FIGS. 1-4, the method 400 may be implemented by a processor (e.g., the processor 202) of a remote controller device (e.g., the remote controller devices 102), of a customer premises device (e.g., a processor of the customer premises device 104), and/or of a device(s) under control (e.g., the device under control 106-120).

In block 402, the processor of the remote controller device 102 may perform a pairing operation with the customer premises device 104. In block 404, the processor of the customer premises device 104 may perform a pairing operation with the remote controller device 102. In some embodiments, the remote controller device 102 and the customer premises device 104 may send and receive information using RF communication signals. The pairing operation may include receiving and/or exchanging configuration information, codes, security credentials, and other information. The processors of the remote controller device 102 and the customer premises device 104 may use the received information to perform configuration operations to enable RF and/or IR communication with each other.

In block 406, the processor of a device under control (106-120) may send synchronization information to the customer premises device 104. In some embodiments, the synchronization information may include a device identifier identifying the device under control (106-120). In some embodiments, synchronization information may include state information indicating an operation status or state. In some embodiments, the synchronization information may include an indication that a device under control (106-120), or an aspect or function of a device under control (106-120), is powered on, is in an idle or standby mode, is in a reduced power mode, is powered off, or another suitable power mode. In some embodiments, the synchronization information may include an indication of one or more operations or functions being performed by the device under control (106-120).

In block 408, the processor of the customer premises device 104 may receive the synchronization information from the device under control (106-120).

In block 410, the processor of the customer premises device 104 may send the synchronization information to the remote controller device 102 via an RF transceiver.

In block 412, the processor of the remote controller device 102 may receive the synchronization information from the customer premises device 104.

In block 414, the processor of the remote controller device 102 may update an indication of a status of the device(s) under control (106-120) based on the synchronization information from the device(s) under control (106-120). In some embodiments, the remote controller device processor 202 may update the device under control's status indication in a memory 204 of the remote controller device. For example, the remote controller device processor 202 may update an indication of an operation status or state of the device(s) under control (106-120). In some embodiments, the operation status or state may indicate that the device under control (106-120), or an aspect or function of the device under control (106-120), is powered on, is in an idle or standby mode, is in a reduced power mode, is powered off, or another suitable power mode. In some embodiments, the operation status or state may include an indication of one or more operations or functions being performed by the device(s) under control (106-120).

In block 416, the processor 202 of the remote controller device may send a command to the device(s) under control (106-120) via an IR transmitter. In some embodiments, the remote controller device processor 202 may format the command based on information provided in the synchronization information. For example, the remote controller device processor 202 may format the command to include one or more specific codes based on the synchronization information. In some embodiments, the remote controller device processor 202 may retrieve one or more specific codes based on a device under control identifier included in the synchronization information. In some embodiments, based on a device under control identifier included in the synchronization information, the remote controller device processor 202 may format the command for the device under control (106-120).

In block 418, the processor of the device under control may receive the command from the remote controller device 102 via an IR signal. In various embodiments, the processor of the device under control may execute or attempt to execute the command received from the remote controller device 102.

Figure 5:
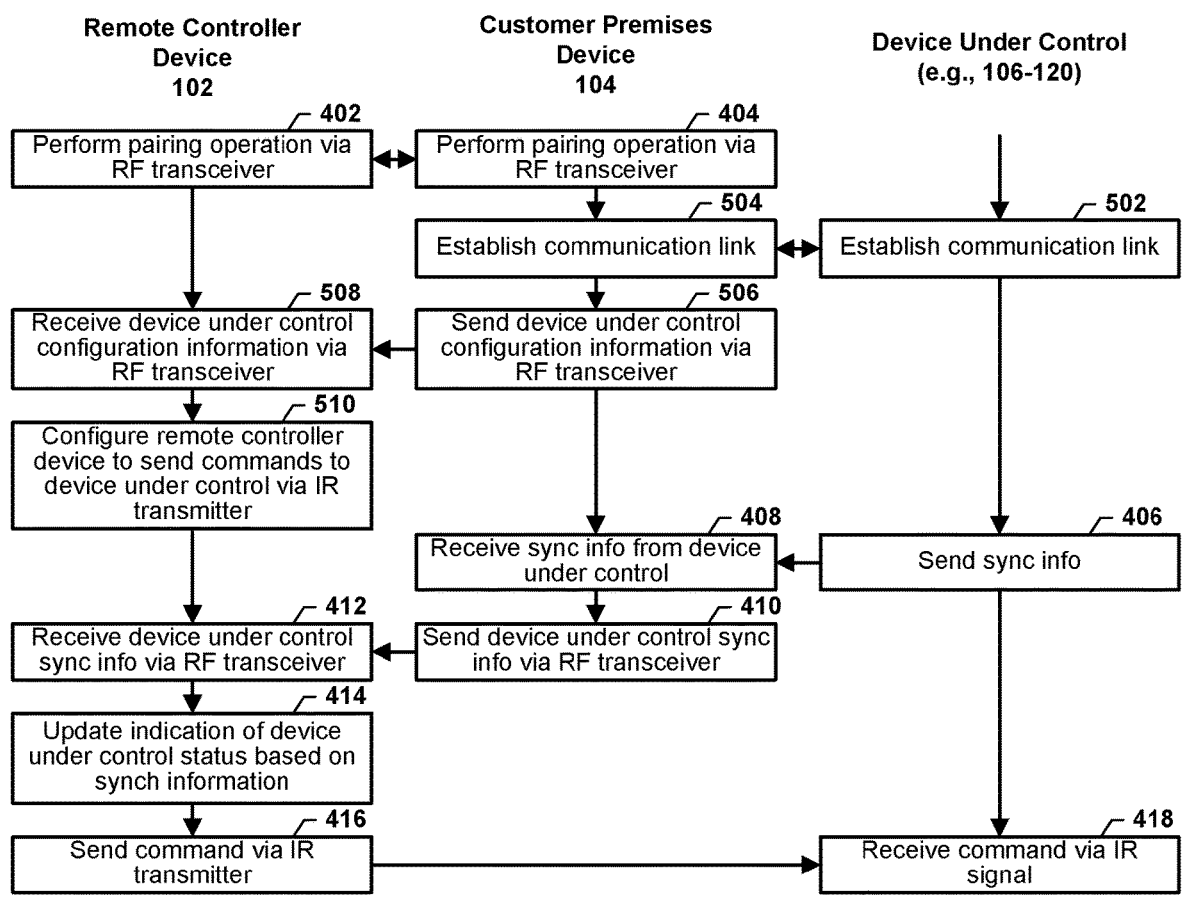

FIG. 5 is a process flow diagram illustrating a method 500 for hybrid IR/RF communication of a remote controller device 102 according to some embodiments. With reference to FIGS. 1-5, the method 500 may be implemented by a processor (e.g., the processor 202) of a remote controller device (e.g., the remote controller devices 102), of a customer premises device (e.g., a processor of the customer premises device 104), and/or of a device under control (e.g., the device under control 106-120). In blocks 402, 404, and 408-418, the processors of the remote controller device, the customer premises device, and the device under control may perform operations of like-numbered blocks of the method 400 as described above with reference to FIG. 4.

In block 502, the processor of the device under control may perform operations to establish a communication link with the customer premises device 104. In some embodiments, the processor of the device under control may send to the customer premises device 104 configuration information enabling a device (e.g., the customer premises device 104, the remote controller device 102, etc.) to communicate with and/or issue commands to the device under control (106-120). In some embodiments, the configuration information may include a codebook, or an indication of a codebook, that may enable another device to format or structure a command to be sent to the device under control (106-120). In some embodiments, the configuration information may enable another device to request or retrieve status information, synchronization information, and/or other information from the device under control (106-120).

In block 504, the processor of the customer premises device 104 may perform operations to establish a communication link with the device under control (106-120). In some embodiments, the customer premises device processor may retrieve or request configuration information from the device under control (106-120).

In block 506, the customer premises device 104 may send configuration information of the device under control (106-120) to the remote controller device 102 via an RF transceiver.

In block 508, the processor 202 of the remote controller device 102 may receive the configuration information of the device under control (106-120) via an RF transceiver.

In block 510, the processor 202 of the remote controller device 102 may configure the remote controller device 102 to send commands to the device under control (106-120) via an IR transmitter.

Figure 6:
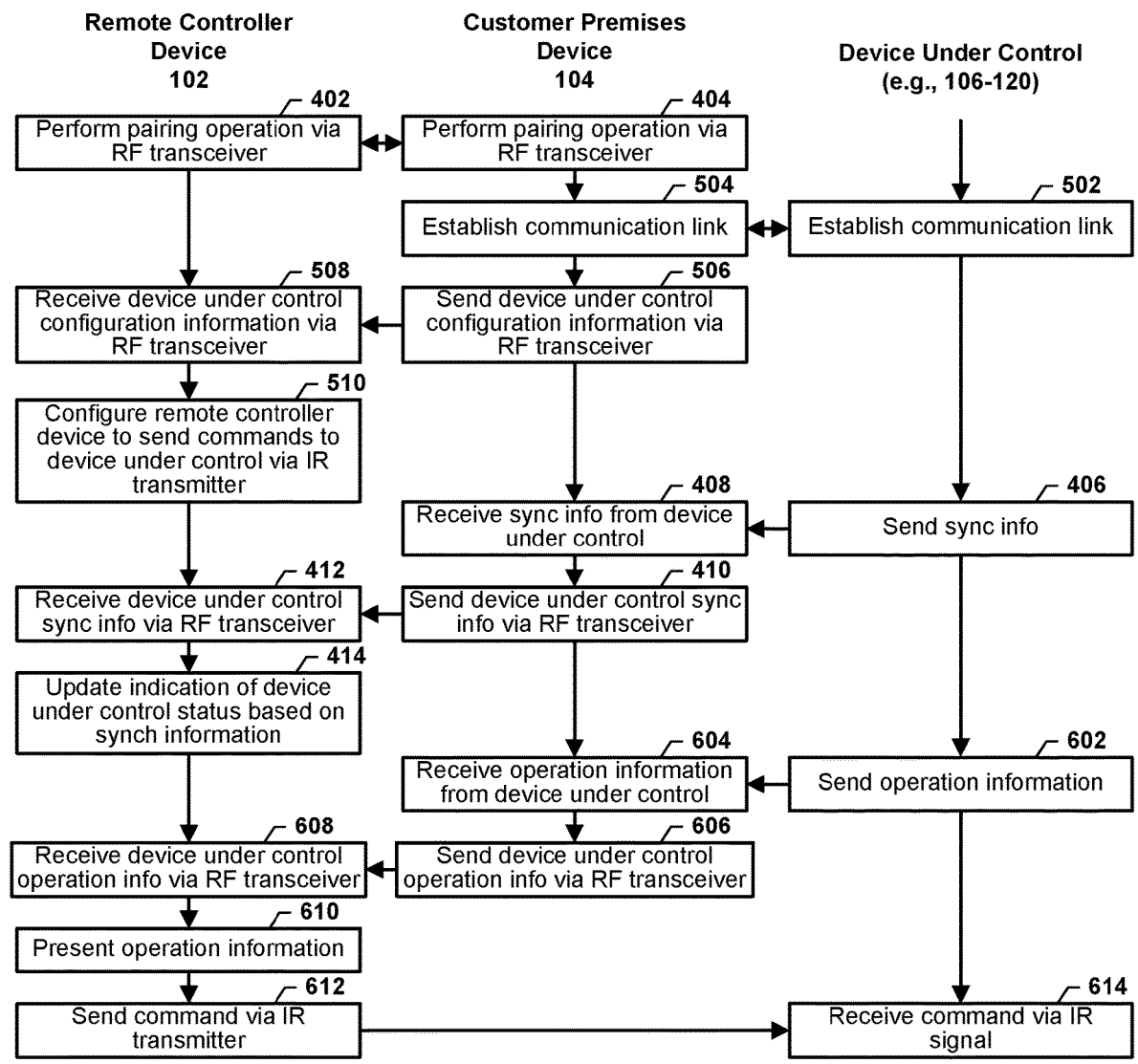

FIG. 6 is a process flow diagram illustrating a method 600 for hybrid IR/RF communication of a remote controller device 102 according to some embodiments. With reference to FIGS. 1-6, the method 600 may be implemented by a processor (e.g., the processor 202) of a remote controller device (e.g., the remote controller devices 102), of a customer premises device (e.g., a processor of the customer premises device 104), and/or of a device under control (e.g., the device under control 106-120). In blocks 402, 404, 408-414, and 502-510 the processors of the remote controller device, the customer premises device, and the device under control may perform operations of like-numbered blocks of the methods 400 and 500 as described above with reference to FIGS. 4 and 5.

In block 602, the processor of the device under control (106-120) may send operation information to the customer premises device 104. In various embodiments, the operation information may include data, information, or signaling generated by the processor of the device under control during device under control operation. For example, a smart thermostat 106 may send temperature information based on an ambient temperature sensed by the thermostat 106. As another example, a smart door lock 112 may send information indicating that someone has rung the smart door lock's doorbell. As another example, the smart door lock 112 may send video information showing an image or video of the person at the door. As another example, a smart ceiling fan 114 may send information indicating a fan speed, or a direction of fan rotation. As another example, a smart lighting system 110 may send information indicating a lighting status, color temperature, hue, delay timing information for dimming or increasing an amount of light, and the like. As another example, a smart speaker may stream information, such as music. As another example, a smart health monitor may send an alert about a person's monitored health condition. As another example, a smart pet feeder may send an indication that it is empty and requires more food. Other examples of device(s) under control and operation information that such device(s) under control may send are also possible.

In block 604, the processor of the customer premises device 104 may receive the operation information from the device under control (106-120).

In block 606, the processor of the customer premises device 104 may send the device under control's operation information to the remote controller device 102 via an RF transceiver.

In block 608, the processor 202 of the remote controller device 102 may receive the device under control's operation information via an RF transceiver.

In block 610, the processor 202 of the remote controller device 102 may present the operation information. For example, the remote controller device processor 202 may display video information on a display device, output audio information via a speaker, provide a visible alert via flashing light, provide a tactile alert via a haptic output device, or may present the operation information via another suitable output device.

In block 612, the processor of the remote controller device may send a command to the device under control (106-120) via the IR transmitter. In some embodiments, the processor 202 of the remote controller device 102 may generate the command based on the device under control (106-120) synchronization information. In some embodiments, the processor 202 of the remote controller device 102 may generate the command based on the synchronization information and the operation information from the device under control (106-120). In some embodiments, the remote controller device processor 202 may generate a properly synchronized command to change or alter one or more operations of the device under control (106-120). For example, the remote controller device processor 202 may send a command to a smart thermostat 106 to change it temperature setting. As another example, the remote controller device processor 202 may send video information to the smart door lock 112 to interact with the person at the door. As another example, the remote controller device processor 202 may send a command to change a smart fan's 114 speed or direction of rotation. As another example, the remote controller device processor 202 may send a command to turn a smart lighting 110 system on or off or to alter the smart lighting system's color temperature, hue, timing information for dimming or increasing an amount of light, and other suitable commands. As another example, the remote controller device processor 202 may send a command to a smart speaker to raise or lower a music volume, or to power on or power off the smart speaker. Other examples of commands from the remote controller device to the device under control are also possible.

In block 614, the processor of the device under control (106-120) may receive the command from the remote controller device 102 via an IR signal. In various embodiments, the processor of the device under control (106-120) may execute or attempt to execute the command, or to perform an operation using information received from the remote controller device 102.

Figure 7:
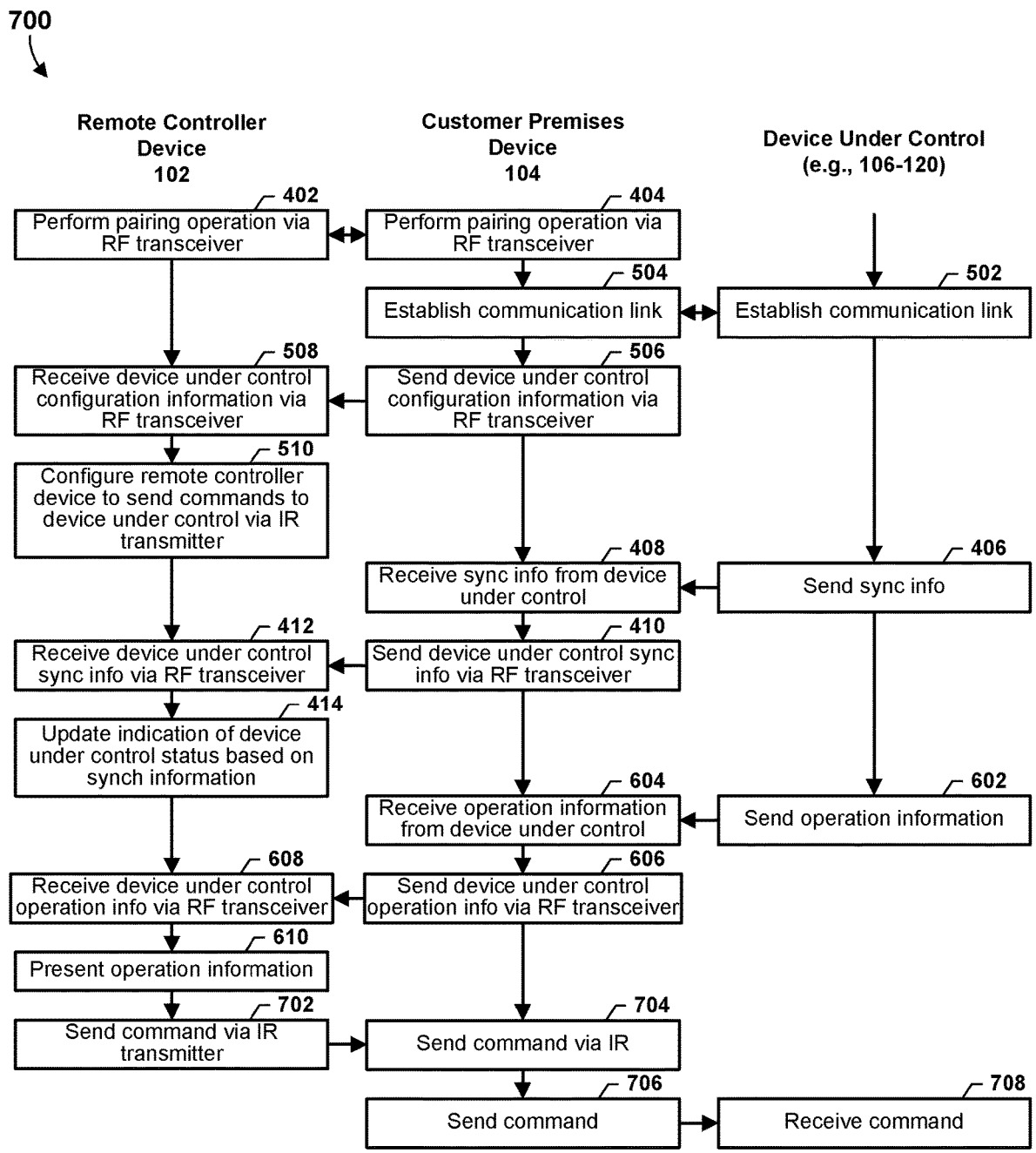

FIG. 7 is a process flow diagram illustrating a method 700 for hybrid IR/RF communication of a remote controller device 102 according to some embodiments. With reference to FIGS. 1-7, the method 700 may be implemented by a processor (e.g., the processor 202) of a remote controller device (e.g., the remote controller devices 102), of a customer premises device (e.g., a processor of the customer premises device 104), and/or of a device under control (e.g., the device under control 106-120). In blocks 402, 404, 408-414, 502-510, and 602-610 the processors of the remote controller device, the customer premises device, and the device under control may perform operations of like-numbered blocks of the methods 400, 500, and 600 as described above with reference to FIGS. 4-6.

In block 702, the processor 202 of the remote controller device 102 may send a command via an IR transmitter 206 to the customer premises device 104. In various embodiments, the command may be similar to the command generated by the remote controller device processor 202 in the operations of block 612 as described.

In block 704, the processor of the customer premises device 104 may receive the command via an IR signal.

In block 706, the processor of the customer premises device 104 may send the command to the device under control (106-120).

In block 708, the processor of the device under control (106-120) may receive the command from the customer premises device 104. In various embodiments, the device under control processor may receive the command from the customer premises device 104 via any suitable wired or wireless communication links. In various embodiments, the processor of the device under control may execute or attempt to execute the command, or to perform an operation using information received from the remote controller device 102.

Figure 8:
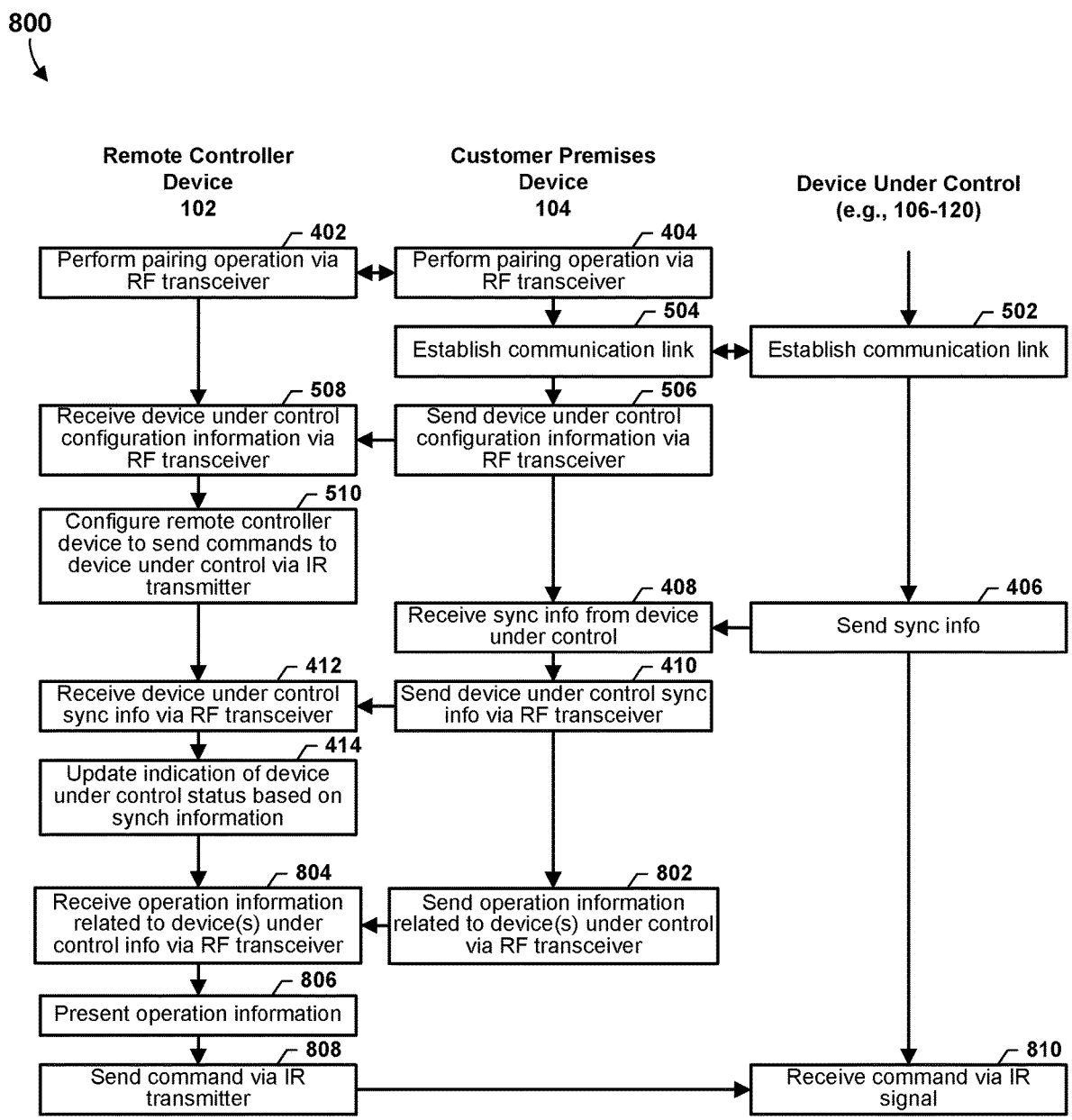

FIG. 8 is a process flow diagram illustrating a method 800 for hybrid IR/RF communication of a remote controller device 102 according to some embodiments. With reference to FIGS. 1-8, the method 800 may be implemented by a processor (e.g., the processor 202) of a remote controller device (e.g., the remote controller devices 102), of a customer premises device (e.g., a processor of the customer premises device 104), and/or of a device under control (e.g., the device under control 106-120). In blocks 402, 404, 408-414, 502-510, 612, and 614 the processors of the remote controller device, the customer premises device, and the device under control may perform operations of like-numbered blocks of the methods 400, 500, and 600 as described above with reference to FIGS. 4-6.

In block 802, the processor of the customer premises device may send operation information related to one or more devices under control to the remote controller device via the RF transceiver. In some embodiments, the operation information may include media content. For example, the customer premises device may send an indication that desired content broadcast is about to begin (such as a concert, a sports event, a television program, and the like). As another example, the customer premises device may transmit content (such as the concert, sports event, television program, etc.) to the remote controller device. As another example, the customer premises device may send an advertisement of the availability of certain content, such as a "pay-per-view" event (e.g., a sports event, a concert, etc.), a movie or television program (e.g., that is available for download or for streaming) In various embodiments, the operation information from the customer premises device 104 may serve as a trigger for operations of the remote controller device 102, as further described below.

In block 804, the processor 202 of the remote controller device 102 may receive the operation information from the customer premises device.

In block 806, the processor 202 of the remote controller device 102 may present the operation information. For example, the remote controller device processor 202 may display video information on a display device, output audio information via a speaker, or may present the operation information via another suitable output device. In some embodiments, the presented operation information may function as a reminder or notice of the content while enabling a user to consume the content, for example, and not miss the beginning of a concert, sporting event, or entertainment.

In block 808, the processor 202 of the remote controller device 102 may send a command via an IR transmitter 206 to one or more device(s) under control 106-120. The command may be based on the received operation information. For example, the command may be directed to the smart television 106, an A/V receiver 108, the speaker device, or the hub device 112 to power on. As another example, the command may be directed to the smart lighting system 114 to dim the lights. Other examples are also possible. In some embodiments, the command may be similar to the command generated by the remote controller device processor 202 in the operations of block 612 as described.

In block 810, the processor of the device under control (106-120) may receive the command from the remote controller device 102. In various embodiments, the processor of the device under control may execute or attempt to execute the command, or to perform an operation using information received from the remote controller device 102.

Various embodiments illustrated and described are provided merely as examples to illustrate various features of the claims. However, features shown and described with respect to any given embodiment are not necessarily limited to the associated embodiment and may be used or combined with other embodiments that are shown and described. Further, the claims are not intended to be limited by any one example embodiment. For example, one or more of the operations of the methods 400, 500, 600, 700, and 800 may be substituted for or combined with one or more operations of the methods 400, 500, 600, 700, and 800, and vice versa.

Various embodiments may be implemented in any number of single or multi-processor systems. Generally, processes are executed on a processor in short time slices so that it appears that multiple processes are running simultaneously on a single processor. When a process is removed from a processor at the end of a time slice, information pertaining to the current operating state of the process may be stored in memory so the process may seamlessly resume its operations when it returns to execution on the processor. This operation state data may include the process's address space, stack space, virtual address space, register set image (e.g., program counter, stack pointer, instruction register, program status word, etc.), accounting information, permissions, access restrictions, and state information.

A process may spawn other processes, and the spawned process (i.e., a child process) may inherit some of the permissions and access restrictions (i.e., context) of the spawning process (i.e., the parent process). A process may be a heavyweight process that includes multiple lightweight processes or threads, which are processes that share all or portions of their context (e.g., address space, stack, permissions, and/or access restrictions, etc.) with other processes/threads. Thus, a single process may include multiple lightweight processes or threads that share, have access to, and/or operate within a single context (i.e., the processor's context).

The foregoing method descriptions and the process flow diagrams are provided merely as illustrative examples and are not intended to require or imply that the blocks of various embodiments must be performed in the order presented. As will be appreciated by one of skill in the art the order of blocks in the foregoing embodiments may be performed in any order. Words such as "thereafter," "then," "next," etc. are not intended to limit the order of the blocks; these words are simply used to guide the reader through the description of the methods. Further, any reference to claim elements in the singular, for example, using the articles "a," "an" or "the" is not to be construed as limiting the element to the singular.

The various illustrative logical blocks, modules, circuits, and algorithm blocks described in connection with the embodiments disclosed herein may be implemented as electronic hardware, computer software, or combinations of both. To clearly illustrate this interchangeability of hardware and software, various illustrative components, blocks, modules, circuits, and blocks have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the claims.

The hardware used to implement the various illustrative logics, logical blocks, modules, and circuits described in connection with the embodiments disclosed herein may be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of communication devices, e.g., a combination of a DSP and a microprocessor, a plurality of microprocessors, one or more microprocessors in conjunction with a DSP core, or any other such configuration. Alternatively, some blocks or methods may be performed by circuitry that is specific to a given function.

In various embodiments, the functions described may be implemented in hardware, software, firmware, or any combination thereof. If implemented in software, the functions may be stored as one or more instructions or code on a non-transitory computer-readable medium or non-transitory processor-readable medium. The operations of a method or algorithm disclosed herein may be embodied in a processor-executable software module, which may reside on a non-transitory computer-readable or processor-readable storage medium. Non-transitory computer-readable or processor-readable storage media may be any storage media that may be accessed by a computer or a processor. By way of example but not limitation, such non-transitory computer-readable or processor-readable media may include RAM, ROM, EEPROM, FLASH memory, CD-ROM or other optical disk storage, magnetic disk storage or other magnetic storage devices, or any other medium that may be used to store desired program code in the form of instructions or data structures and that may be accessed by a computer. Disk and disc, as used herein, includes compact disc (CD), laser disc, optical disc, digital versatile disc (DVD), floppy disk, and Blu-ray disc where disks usually reproduce data magnetically, while discs reproduce data optically with lasers. Combinations of the above are also included within the scope of non-transitory computer-readable and processor-readable media. Additionally, the operations of a method or algorithm may reside as one or any combination or set of codes and/or instructions on a non-transitory processor-readable medium and/or computer-readable medium, which may be incorporated into a computer program product.

The preceding description of the disclosed embodiments is provided to enable any person skilled in the art to make or use the present embodiments. Various modifications to these embodiments will be readily apparent to those skilled in the art, and the generic principles defined herein may be applied to other embodiments without departing from the spirit or scope of the embodiments. Thus, various embodiments are not intended to be limited to the embodiments shown herein but are to be accorded the widest scope consistent with the following claims and the principles and novel features disclosed herein.

What is claimed is:

1. A remote controller device, comprising:
   a memory;
   a radio frequency (RF) transceiver;
   an infrared (IR) transmitter;
   an output device; and
   a processor coupled to the memory, the RF transceiver, the IR transmitter and the output device, and configured with processor-executable instructions to perform operations comprising:
      receiving, from a customer premises device via the RF transceiver, synchronization information about a device under control in communication with the customer premises device;
      updating an indication of a device under control status based on the synchronization information;
      receiving, from the customer premises device via the RF transceiver, operation information generated by the device under control;
      generating a command upon receipt of the operation information, wherein the generated command is based on the updated status of the device under control and the operation information generated by the device under control, and wherein the operation information serves as a trigger for generating the command; and
      sending, via the IR transmitter, the generated command to the device under control.

2. The remote controller device of claim 1, wherein the processor is configured with processor-executable instructions to perform operations further comprising:
   performing a RF pairing operation with the customer premises device that enables the remote controller device to send commands to the device under control.

3. The remote controller device of claim 2, wherein the processor is configured with processor-executable instructions to perform operations further comprising:
   receiving, from the customer premises device via the RF transceiver, device under control configuration information; and
   configuring the remote controller device to send commands to the device under control via the IR transmitter based on the device under control configuration information.

4. The remote controller device of claim 1, wherein the processor is configured with processor-executable instructions to perform operations further comprising:
   sending, via the IR transmitter, a command for the device under control to the customer premises device based on both the updated status of the device under control and the operation information generated by the device under control that is presented on the output device.

5. The remote controller device of claim 1, wherein the processor is configured with processor-executable instructions to perform operations further comprising:
receiving, from the customer premises device via the RF transceiver, operation information generated by the device under control sent by the customer premises device to the remote controller device; and
presenting the operation information generated by the device under control received from the customer premises device on the output device.

6. The remote controller device of claim 5, wherein the operation information comprises media content, and
wherein presenting the operation information generated by the device under control received from the customer premises device on the output device comprises presenting the media content on the output device.

7. The remote controller device of claim 1, wherein the processor is configured with processor-executable instructions to perform operations such that sending, via the IR transmitter, a command to the device under control that is generated based on both the updated status of the device under control and the operation information generated by the device under control that is presented on the output device comprises:
formatting the command based on the synchronization information.

8. A method of hybrid IR/RF communication, comprising:
receiving, by a processor of a remote controller device from a customer premises device via an RF transceiver, synchronization information about a device under control in communication with the customer premises device;
updating, by the processor, an indication of a device under control status based on the synchronization information;
receiving, by the processor from the customer premises device via the RF transceiver, operation information generated by the device under control;
generating a command upon receipt of the operation information, wherein the generated command is based on the updated status of the device under control and the operation information generated by the device under control, and wherein the operation information serves as a trigger for generating the command; and
sending, by the processor via the IR transmitter, the generated command to the device under control.

9. The method of claim 8, further comprising:
performing, by the processor, a RF pairing operation with the customer premises device that enables the remote controller device to send commands to the device under control.

10. The method of claim 9, further comprising:
receiving, by the processor from the customer premises device via the RF transceiver, device under control configuration information; and
configuring, by the processor, the remote controller device to send commands to the device under control via the IR transmitter based on the device under control configuration information.

11. The method of claim 8, further comprising:
sending, by the processor via the IR transmitter, a command for the device under control to the customer premises device based on both the updated status of the device under control and the operation information generated by the device under control that is presented on the output device.

12. The method of claim 8, further comprising:
receiving, by the processor from the customer premises device via the RF transceiver, operation information generated by the device under control sent by the customer premises device to the remote controller device; and
presenting, by the processor, the operation information generated by the device under control received from the customer premises device on an output device of the remote controller device.

13. The method of claim 12, wherein the operation information comprises media content, and
wherein presenting the operation information generated by the device under control received from the customer premises device on the output device comprises presenting the media content on the output device.

14. The method of claim 8, wherein sending, via the IR transmitter, a command to the device under control that is generated based on both the updated status of the device under control and the operation information generated by the device under control that is presented on the output device comprises:
formatting, by the processor, the command based on the synchronization information.

15. A non-transitory processor-readable storage medium having stored thereon processor-executable instructions configured to cause a processor of a remote controller device to perform operations, comprising:
receiving, from a customer premises device via an RF transceiver, synchronization information about a device under control in communication with the customer premises device;
updating an indication of a device under control status based on the synchronization information;
receiving, from the customer premises device via the RF transceiver, operation information generated by the device under control;
generating a command upon receipt of the operation information, wherein the generated command is based on the updated status of the device under control and the operation information generated by the device under control, and wherein the operation information serves as a trigger for generating the command; and
sending, via an IR transmitter, the generated command to the device under control.

16. The non-transitory processor-readable storage medium of claim 15, wherein the stored processor-executable instructions are configured to cause the processor of the remote controller device to perform operations further comprising:
performing a RF pairing operation with the customer premises device that enables the remote controller device to send commands to the device under control.

17. The non-transitory processor-readable storage medium of claim 16, wherein the stored processor-executable instructions are configured to cause the processor of the remote controller device to perform operations further comprising:
receiving, from the customer premises device via the RF transceiver, device under control configuration information; and configuring the remote controller device to send commands to the device under control via the IR transmitter based on the device under control configuration information.

18. The non-transitory processor-readable storage medium of claim 15, wherein the stored processor-executable instructions are configured to cause the processor of the remote controller device to perform operations further comprising:

sending, via the IR transmitter, a command for the device under control to the customer premises device based on both the updated status of the device under control and the operation information generated by the device under control that is presented on the output device of the remote controller device.

19. The non-transitory processor-readable storage medium of claim 15, wherein the stored processor-executable instructions are configured to cause the processor of the remote controller device to perform operations further comprising:

receiving, from the customer premises device via the RF transceiver, operation information generated by the device under control sent by the customer premises device to the remote controller device; and presenting the operation information generated by the device under control received from the customer premises device on the output device of the remote controller device.

20. The non-transitory processor-readable storage medium of claim 19, wherein the operation information comprises media content, and wherein the stored processor-executable instructions are configured to cause the processor of the remote controller device to perform operations such that presenting the operation information generated by the device under control received from the customer premises device on the output device comprises presenting the media content on the output device of the remote controller device.

21. The non-transitory processor-readable storage medium of claim 15, wherein the stored processor-executable instructions are configured to cause the processor of the remote controller device to perform operations such that sending, via the IR transmitter, a command to the device under control that is generated based on both the updated status of the device under control and the operation information generated by the device under control that is presented on the output device comprises:

formatting the command based on the synchronization information.

\* \* \* \* \*